P. Adie.
Clipping Horses.
No. 3,767. Reissued Dec. 21, 1869.
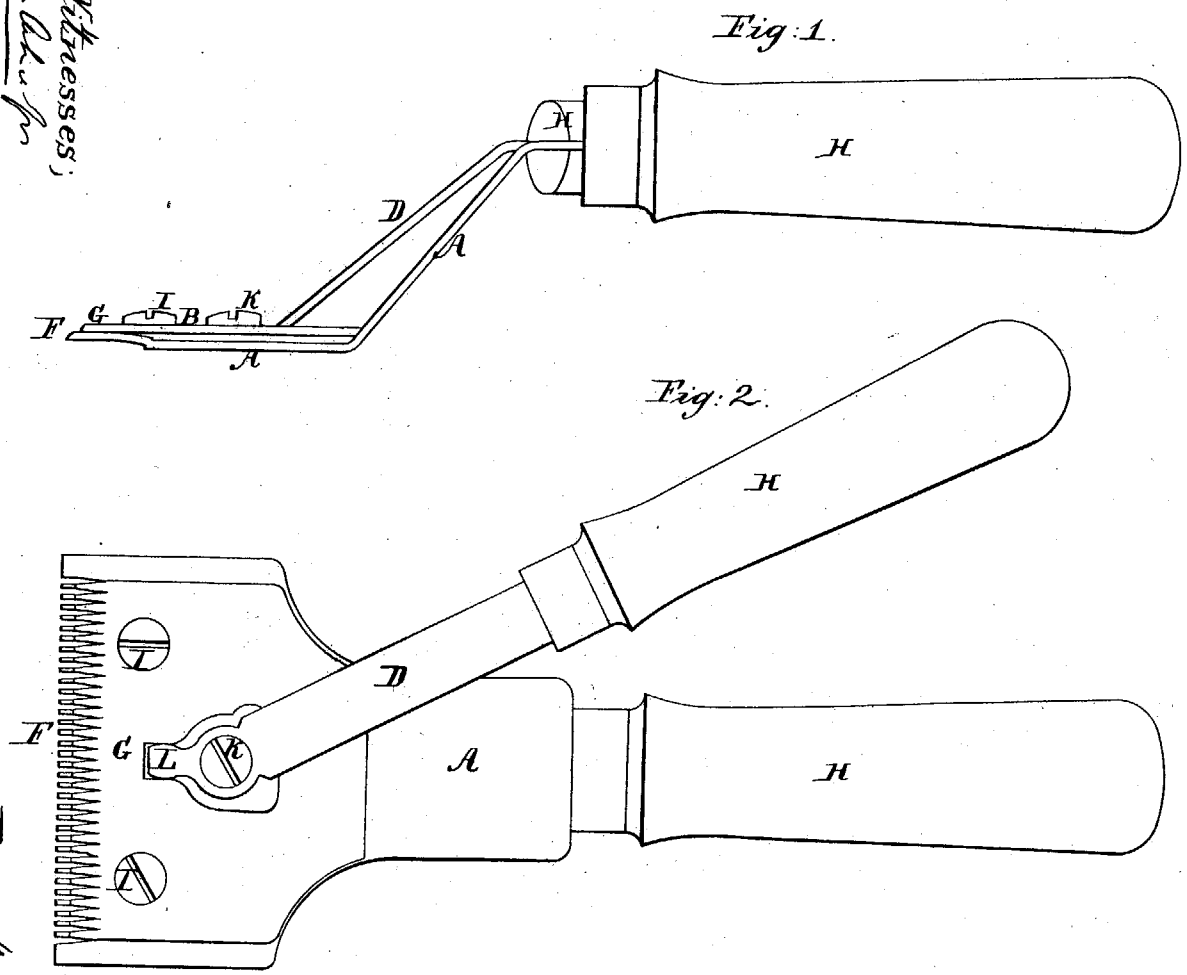
Witnesses;
E. H. Ashcroft
J. A. Cooke
Inventor;
Patrick Adie
N. PETERS, PHOTO-LITHOGRAPHER, WASHINGTON, D. C.

United States Patent Office.

PATRICK ADIE, OF THE STRAND, LONDON, ENGLAND.

*Letters Patent No.* 79,293, *dated June* 30, 1868; *patented in England, April* 24, 1867; *reissue No.* 3,767, *dated December* 21, 1869.

IMPROVEMENT IN MACHINE FOR CLIPPING HORSES' HAIR.

The Schedule referred to in these Letters Patent and making part of the same.

*To all to whom these presents shall come:*

Be it known that I, PATRICK ADIE, of the Strand, in the county of Middlesex, London, England, have invented an Improved Machine for Clipping Horses' Hair; and that the following is a full and exact description thereof, reference being had to the accompanying drawings, and to the letters of reference thereon, and making a part of this specification.

My invention consists in clipping horses and other short-haired animals by means of a number of cutting-shears, so arranged and constructed that the under series acts as comb and cutter combined, thus raising the hair for cutting with the upper series, as these pass over them, and regulating the length of the coat left on the skin; also protecting the skin of the animal from injury.

*Description of Drawings.*

Figure I represents a side view of my improvement.

Figure II, the same, in plan.

A A represent the body or under plate of the machine, made generally of steel.

F, the front side of A, made either straight or curved, being cut into teeth pointed like a comb, or blunt and nearly parallel in the projecting portions, and being worked into cutting-teeth behind these points, the cutting-edges being next to B, which is a plate, either all or partly of steel, with tapered teeth on side G, similar to the cutting-parts of A at F, with the teeth facing against those at F.

This plate is pressed against A by means of two screws, I I, passing through slotted holes in B, and screwed into A. The number of these screws may be increased, as stated in my English provisional specification, No. 2,796, of October 30, 1866.

The comb-parts of the teeth, at F, project all their length beyond the cutter-points G, so as to prevent these cutting the skin.

D is a bent lever, fixed, also, to A, with centre of motion at K.

L, the short end of the lever, working in a slot in B, and by moving the lever-handle H from side to side, lateral motion is given to the plate B, and the cutters, which clip both ways, clip all that comes between them, the length of the coat being regulated by the thickness of A, which may be varied.

Necessary steadiness and rigidity are given, also, to the top plate B, by causing it to press on the back or opposite edge from G, so as to prevent the hair from lifting it, and getting between the plates at the cutting-portions.

The size and number of the teeth may be varied, according to the quality of the work required.

I am aware that sheep-shearing machines have been devised, in which a number of teeth has been tried, the plates bearing such teeth or cutters being vibrated by means, in some machines, of a system of pinions, racks, pawls, wheels, &c., and in others, of very complicated levers worked by hand, by means of a spring.

I do, therefore, lay no claim to any such machine; nor do I claim, or intend to claim, broadly, cutter-teethed plates, arranged and made to slide on each other; but as, in my machine, I dispense entirely with racks, wheels, pawls, or any complication of compound levers, and as the vibratory motion of my cutter-teethed plate is obtained by means of the single, simple hand-lever L K D H, having its fulcrum at K, the end L, working in the opening in plate B, which, as aforesaid, is held and guided in its vibratory motion by two or more screws, I I, my machine is so much simpler than any other known or devised, and by reason of the bearing given to the back of the top plate, which I call heel-spring, the hair is prevented from getting between the faces of the teeth, which would stop its action immediately, thus giving to it an efficiency hitherto unattained, that

What I claim, and desire to secure by Letters Patent of the United States, is—

1. The arrangement and combination of the teethed plates A and B, screws I and I, and handle A H, with handle or lever L K D H, the whole constructed and operated substantially in the manner and for the purpose set forth and described.

2. The combination of the two teeth-plates of the clipping-machine, whereby the faces of the teeth are kept in proper contact, by reason of the elasticity of the teeth-cutting plates, all constructed substantially in the manner and for the purpose described.

In testimony whereof, I have hereunto set my hand, before two subscribing witnesses.

PATRICK ADIE.

Witnesses:

E. H. ADIE, Jr.,

T. A. COOK.